United States Patent [19]

Curchod et al.

[11] 3,910,121

[45] Oct. 7, 1975

[54] DYNAMIC BALANCING MACHINE

[75] Inventors: Donald B. Curchod, Avalon; Allan C. Madden, Killarney Heights, both of Australia

[73] Assignee: Nortron Corporation, Mountain View, Calif.

[22] Filed: Aug. 28, 1973

[21] Appl. No.: 392,194

[52] U.S. Cl. ........................................... 73/462; 73/477
[51] Int. Cl.² ................................................. G01M 1/22
[58] Field of Search ............. 73/462, 464, 471–473, 73/475–477

[56] References Cited
UNITED STATES PATENTS

| | | | |
|---|---|---|---|
| 2,131,602 | 9/1938 | Thearle | 73/462 |
| 2,167,488 | 7/1939 | Ohlson | 73/462 |
| 2,947,172 | 8/1960 | King | 73/462 |
| 3,732,737 | 5/1973 | Forster | 73/462 |

*Primary Examiner*—James J. Gill
*Attorney, Agent, or Firm*—Flehr, Hohbach, Test, Albritton & Herbert

[57] ABSTRACT

A dynamic balancing machine for balancing wheels and the like which indicates the imbalance weight required and its position on the wheel. The machine includes a force transmission member which is supported for movement in one plane. A drive shaft is mounted on the member to receive support and drive the wheel at relatively high rotational speeds whereby out-of-balance forces are generated by the rotating member. The forces tend to move the force transmission member in said plane. The forces in said plane are measured and related to the position of the driven wheel to provide the indication of imbalance weight and position.

11 Claims, 8 Drawing Figures

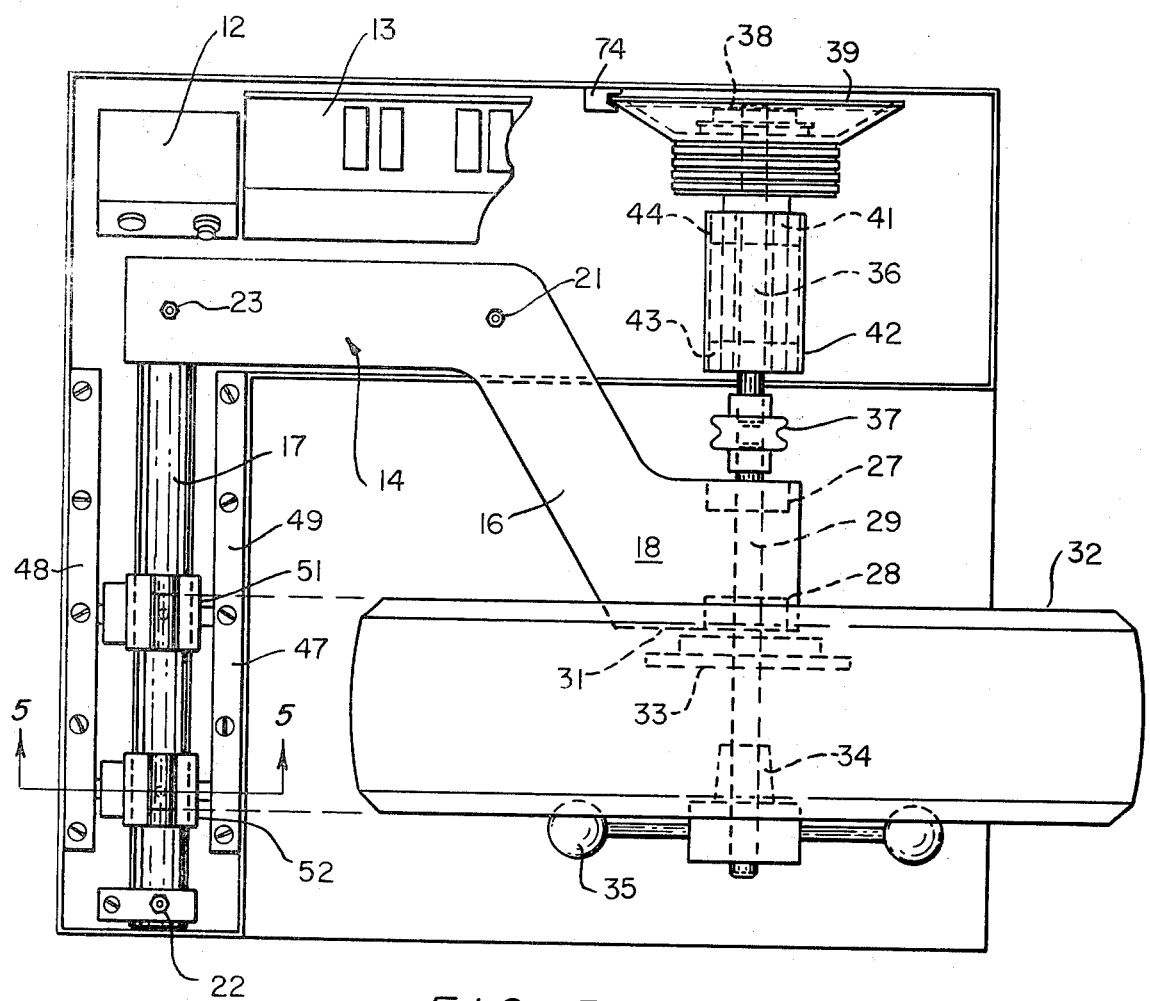
FIG. 3
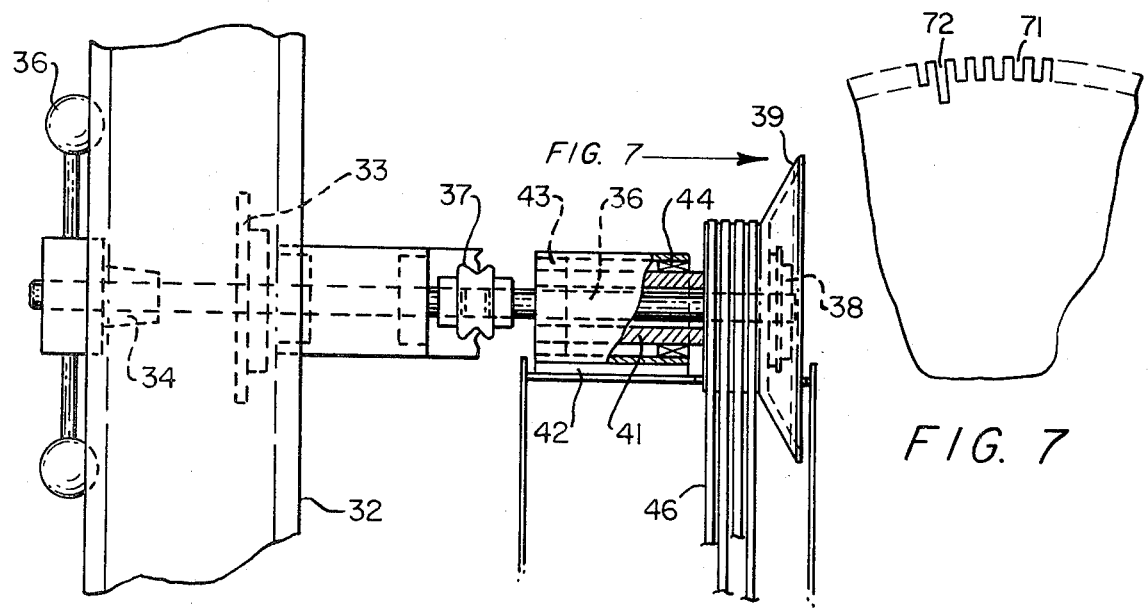
FIG. 4
FIG. 7

DYNAMIC BALANCING MACHINE

BACKGROUND OF THE INVENTION

This invention relates generally to a balancing machine and more particularly to a balancing machine which indicates the position and weight required for balancing an associated driven member such as a wheel.

Prior art wheel balancers have been of two types, static and dynamic. In static wheel balancers, the wheel is removed from the vehicle or shaft with which it is associated and placed on a stand with its axis vertical. The stand permits the wheel to assume an equilibrium position. A level bubble is associated with the member to be balanced and gives an indication of the direction and degree of tilt of the axis. Weights are added until the axis of the member is vertical.

In dynamic balancing, the wheel is rotated either on the shaft with which it is associated or removed therefrom, mounted on a drive shaft and rotated. An extension of the drive shaft is mounted on the wheel or shaft. When the shaft and wheel are rotated, the out-of-balance forces cause the extension to move off axis. The operator applies weights until the extension remains on axis as the wheel is rotated.

Neither of the prior art methods provides an accurate indication of the location at which a weight must be placed nor the magnitude of the weight to be added. The magnitude is generally achieved by trial and error and repeated tests are required to balance an associated member.

OBJECTS AND SUMMARY OF THE INVENTION

It is an object of the present invention to provide a balancing machine which gives a direct indication of the balance weight required and its position on the rotating member for balancing.

It is another object of the present invention to provide a wheel balancing apparatus which is simple in construction and reliable in operation.

The foregoing and other objects of the invention are achieved by a wheel balancing machine in which the member to be balanced is supported on a force transmitting member including first and second arms with one end of the first arm being offset so that it lies opposite the second arm. A driven shaft is mounted on said one end of the first arm parallel to the second arm and is adapted to receive the member to be balanced. When the member is driven, it generates out-of-balance forces which tend to move the force transmission member in said one plane. Means are associated with said force transmitting member to give a signal proportional to the out-of-balance forces. The machine further includes means for generating a signal corresponding to the out-of-balance location. Electronic means receive said signals and give an indication of the balance weight required and its position.

BRIEF DESCRIPTION OF THE DRAWING

FIG. 3 is a plan view of the machine, partly in section.

FIG. 4 is a sectional view taken generally along the line 4—4 of FIG. 1.

FIG. 7 is an enlarged view of a portion of the edge of the drive pulley taken along the line 7—7 of FIG. 4.

DESCRIPTION OF PREFERRED EMBODIMENT

Figure 1:
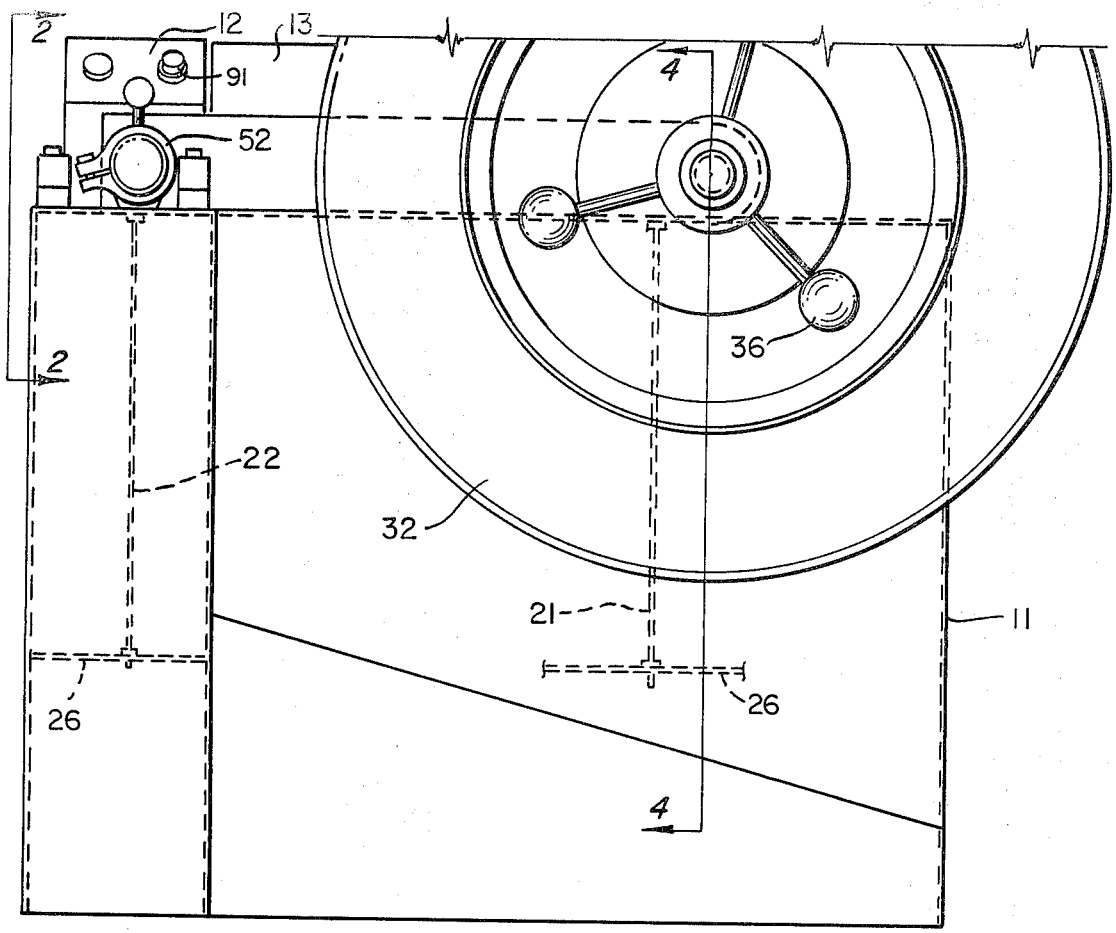
FIG. 1 is a front elevational view of a machine incorporating the present invention.
Figure 2:
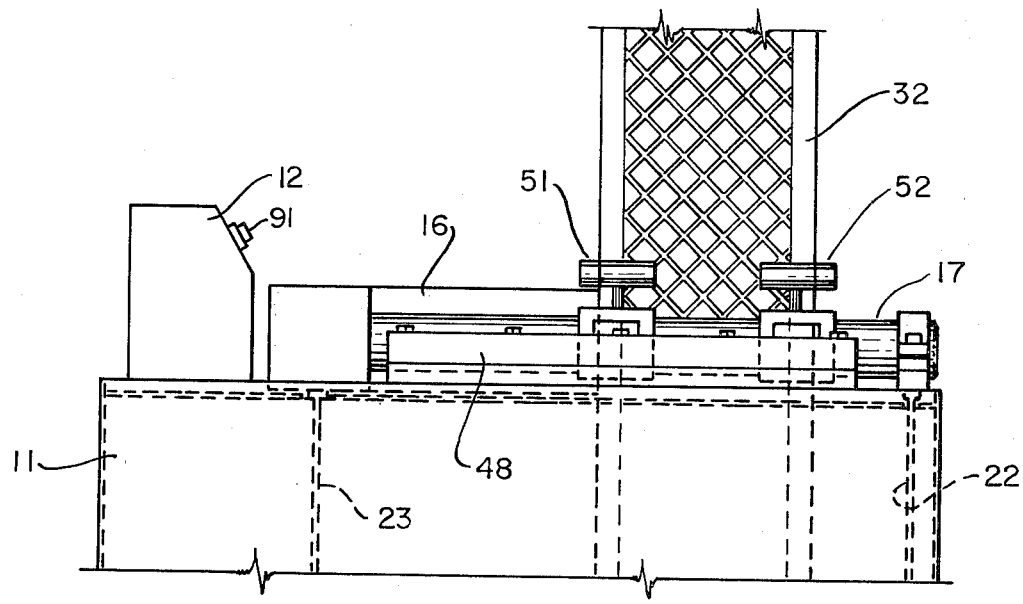
FIG. 2 is a side elevational view of the top portion of the machine shown in FIG. 1 taken generally along the line 2—2 of FIG. 1.

Referring to FIG. 1, the machine includes a cabinet or housing 11 which serves to house and support the mechanical and electrical components of the machine. The upper portion of the housing includes a control panel 12 and a display panel 13, FIGS. 1 and 3. The apparatus includes a force transmitting member 14 which includes a first arm 16 and a second arm 17 extending at right angles with respect to the first arm. The first arm 16 is offset at its outer end 18 whereby it lies opposite the central portion of the arm 17. The force transmitting member is supported from the cabinet by three spaced flexible support rods which extend between the cabinet and the force transmitting member. One rod 21, FIGS. 1 and 3, engages and supports the outer end of the first arm. A second rod 22 serves to engage and support the outer end of the second arm, and a third rod 23 serves to engage and support the common ends of both arms. The flexible rods 21, 22 and 23 permit motion of the force transmitting member in a plane perpendicular to the axis of the rods while restricting any movement of the force transmitting member in any other direction. Preferably, the rods 21, 22 and 23 engage support 26 attached to the housing walls. The position of the rods is adjustable whereby the plane of the force transmitting member can be moved until it is perpendicular to the axis of the three rods.

Spaced bearings 27 and 28 are mounted in the offset end 18 of the arm and receive and support drive shaft 29. One end of the shaft extends beyond the face 31 of the arm end 18 and is adapted to receive the member to be balanced, such as the wheel and tire illustrated at 32. The shaft carries plate 33 and threadably receives conically shaped nut 34 which is rotated by handles 35. The wheel is placed on the shaft. The nut 34 is applied and tightened. The nut engages the center wheel hole to center the wheel and force it into abutment with the plate 33. The shaft is coupled to a driven shaft 36 by flexible coupling 37. The other end of the driven shaft 36 engages a flexible drive member 38 secured to the face of pulley 39. It is observed that the shaft 36 is flexibly supported at its two ends whereby the force transmitting member may move in the horizontal plane.

The drive pulley 39 includes a cylindrical extension 41 supported by bearing housing 42 mounted on the housing 11. The cylindrical bearing housing receives spaced bearings 43 and 44 which engage the cylindrical extension to support the pulley. The pulley is driven by means of belts 46 from a motor (not shown) mounted at the lower part of the housing. By energizing the motor, the pulley is driven driving the shafts 36 and 29 to rotate the wheel and generate imbalance forces. The imbalance forces can only move the force transmitting member in its own plane because of the support described.

Figure 5:
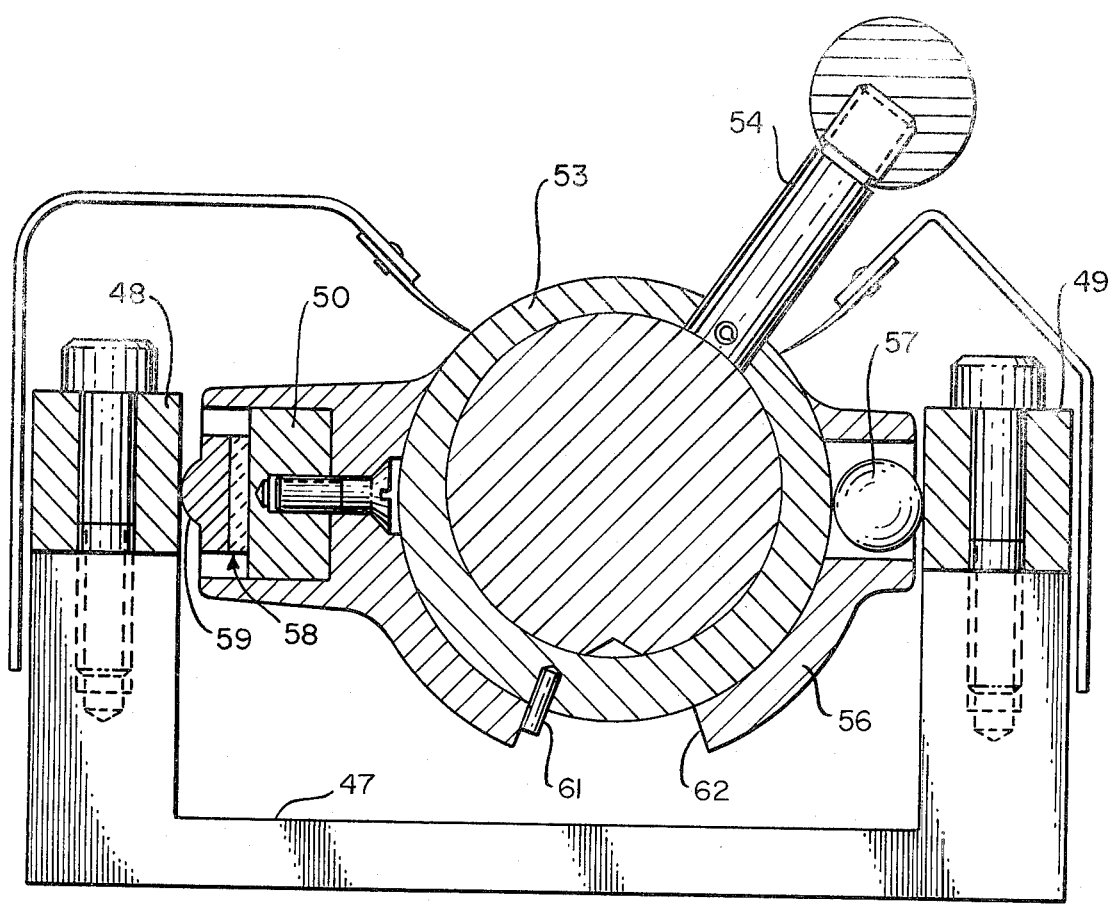
FIG. 5 is a sectional view taken generally along the line 5—5 of FIG. 3.
Figure 6:
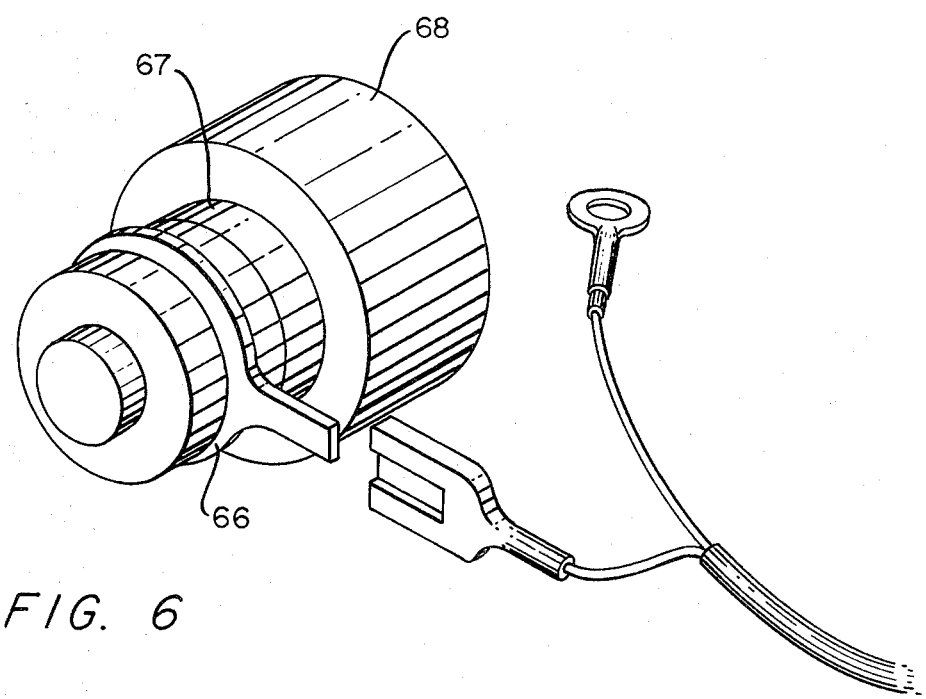
FIG. 6 is an enlarged view of the force transducer assembly shown in FIG. 5.

The arm 17 is disposed within a channel-shaped member 47 carried by the cabinet. The channel-shaped member is provided with spaced rails 48 and 49, FIGS. 3 and 5. The arm 17 is preferably cylindrical and carries a pair of clamping assemblies 51 and 52 which can slide along the arm to be positioned therealong. The clamping members comprise a cam 53 which is rotated by means of handle 54. A carrier 56 surrounds the cam. On one side of the arm the carrier accommodates a floating lock ball 57. On the other side of the arm, the carrier accommodates a force transducer assembly 58. By rotating the cam, the ball is forced outwardly against the rail 49 and the reactive forces urge the force transducer drive member 59 against the opposite rail 48. A stop pin 61 abuts the ends of a slot 62 to limit the rotational movement of the cam.

The transducer assembly includes the transducer drive member 59, a conductive plate 66, a piezoelectric ceramic disc 67 and back-up member 68. Electrical contact is made to one face of the transducer by the contacting member 66 and to the other side of the transducer by the back-up member 68. In operation, the clamping assemblies 51 and 52 are located opposite the two edges of the wheel to be balanced and clamped. Thereafter, when the wheel is rotated, the imbalance forces generated by the wheel in the arm 14 are transmitted through the arm to the clamping means whereby there is a reaction force on the transducer which generates an electrical signal proportional to the force.

In order to give a signal which is indicative of the angular position of the wheel, the pulley includes a plurality of slots at its outer periphery, FIG. 7. Position slots 71 are equally spaced around the periphery. A deeper slot 72 serves as a reference slot. A photoelectric transducer 74 comprising a light source and a pair of transducers serves to generate pulses as the slots pass between the light source and the transducers. One transducer generates position signals corresponding to the smaller slot 71 and the other generates a reference signal corresponding to the indexing slot 72.

Figure 8:
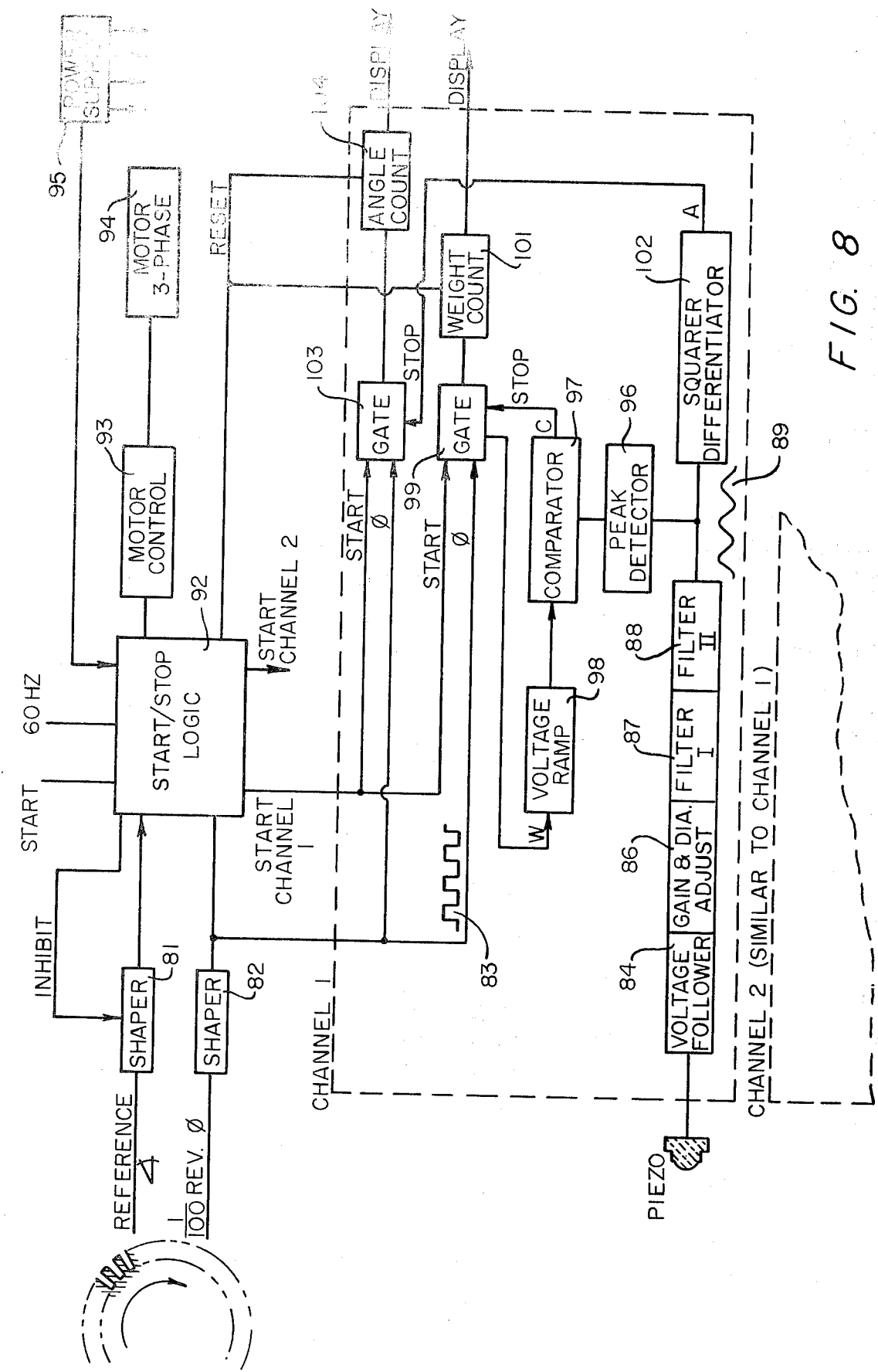
FIG. 8 is a block diagram of an electronic circuit for receiving the output from the force transducer and providing the indications of balance weight required and position.

Referring to FIG. 8, electrical circuitry associated with the photoelectric transducers and the piezoelectric force transducer is shown. The output of the reference transducer is applied to a shaper 81 and the output of the angle transducer is applied to a shaper 82, which shapers serve to form rectangular output pulses such as the position pulses shown at 83.

It will be appreciated that the output of the piezoelectric force transducer periodically goes from a first to a second value when imbalance weight is directly opposite the transducer. The output from the piezoelectric transducer is amplified by amplifier 84 and applied to a gain adjuster 86 wherein the amount of gain can be calibrated to give out-of-balance weight indications for different wheel diameters. Finally, the output signal is applied to filters 87 and 88. The output signal from the filters is a sinewave whose phase with respect to the reference signal depends upon the location of the out-of-balance weight and whose amplitude is dependent upon the magnitude of the out-of-balance forces. The sinewave 89, FIG. 8, and the squarewaves from the reference and position transducers are processed in electronic circuitry to give an indication of the location of the imbalance force and the amount of balance weight required for balancing the machine. The position and weight required is suitably displayed as, for example, it may be displayed on a Nixie tube readout wherein the balance weight is indicated in ounces or grams and fractions thereof, and wherein the angle or position of the imbalance from the reference position is indicated in numbers corresponding to the number of notches from the reference notch whereby the wheel can be positioned and the correct balance weight applied before removing the wheel from the machine.

To conduct a test, the start button 91 is depressed which causes the logic 92 to apply a signal to the motor control 93 to energize the motor 94 from the power supply 95 via the logic. As the motor comes up to speed, the slotted pulley turns and the phototransistor sends reference pulses, one per revolution, and position pulses, 100 per revolution, to the control logic 92. The control logic compares the position pulses to the input line frequency and determines when the rotational speed of the pulley reaches the rated motor speed value, for example, 480 RPM. After a delay, in the order of a few seconds, to allow the system to reach a uniform speed, the control logic generates a start signal which initiates a reading of angular position of the imbalance and the balance weight required for balancing.

The sinewave output 89 from the filter 88 is applied to a peak detector 96 which generates a d.c. voltage proportional to the sinewave amplitude. The d.c. voltage is applied to a comparator 97 which has an input from a voltage ramp generator 98. After the wheel is up to speed and at the reference pulse input, the control logic generates a start signal. The signal is applied to the gate 99. The gate 99 triggers the voltage ramp generator 98 and when the voltage on the ramp 98 is equal to the voltage from the peak detector, the comparator 97 generates a stop signal closing the gate 99. It is apparent that the time lapse between the start of the ramp pulse and the closing of the gate 99 is dependent upon the magnitude of the voltage output from the peak detector. The gate 99 has applied thereto the periodic squarewaves 83 and serves to pass these squarewaves to weight counter 101. The count is representative of the magnitude of the sinewave voltage 89. Thus, the weight counter 101 provides drive signal to a display which then displays the balance weight required (amount of imbalance). As previously described, the gain adjustment 86 is employed to calibrate for various size wheels.

The sinewave 89 is also applied to a squarer-differentiator 102 and thence to gate 103. When open, the gate 103 passes the waveform 83 to the angle counter 104 which drives an associated display. The gate is opened by the start signal generated by the logic and serves to pass the squarewaves 83 until it is stopped by a signal from the squarer-differentiator 102. The squarer-differentiator generates a stop pulse at the next zero cross-over of the sinewave after the commencement of a count cycle. Since the gate was opened at the reference time, the count represents the number of position notches after the reference notch at which the imbalance occurred. A second channel of electronics similar to that just described is employed for the second clamping transducer assembly.

After a suitable time delay to ensure that both channel readings have been taken, the control logic switches the motor into reverse and the motor is braked. When the wheel is near standstill, the motor power is switched off. Depressing the start button initiates another cycle.

We claim:

1. A balancing machine for balancing a rotating member comprising a force transmitting member including a force arm, means for supporting said force transmitting member so that it can move substantially only in one plane, a drive shaft for driving said rotating member mounted on said force transmitting member spaced from and having its axis parallel to said force arm, means for mounting the member to be balanced on one end of said drive shaft opposite said force arm, a fixed member disposed adjacent said force arm in said plane of movement, a force transducer adapted to be disposed between said force arm and said fixed member opposite a predetermined plane of said rotating member serving to generate an electrical signal proportional to force, means for holding said force arm and fixed member in cooperation with the transducer, means including a flexible coupling for driving the other end of said drive shaft and associated rotating member whereby to generate imbalance forces which are transferred by said force transmitting member to said transducer through said arm and means connected to receive said electrical signal and generate a first signal proportional to the force whereby to indicate the amount of imbalance of the rotating member at a position opposite said force transducer.

2. A balancing machine as in claim 1 including means associated with said drive shaft for generating a second signal indicative of the angular position of the imbalance on the rotating member.

3. A machine as in claim 2 including means for receiving and processing said first and second signals to provide an indication of balance weight required and angular position thereof.

4. A machine as in claim 1 wherein said means for supporting said force transmitting member comprises at least three spaced flexible rods.

5. A wheel balancing machine comprising a force transmitting member including a force arm, means for supporting said force transmitting member so that it can move substantially only in one plane, a drive shaft mounted on said force transmitting member spaced from and having its axis parallel to said force arm, means on one end of said drive shaft for removably mounting the wheel to be balanced on said drive shaft opposite said force arm, fixed elongated means disposed and parallel to said force arm in said plane of movement, a force transducer serving to generate an electrical signal proportional to force, means movable along said force arm for mounting said force transducer between said force arm and said fixed means opposite a selected plane of said wheel, means for urging said force arm and fixed means towards one another to clamp the transducer at a selected location along the force arm therebetween, means connected to the other end of said drive shaft and wheel whereby to generate imbalance forces which are transferred by said force transmitting member to said arm, and means connected to receive said electrical signal and generate a first signal proportional to the force whereby to indicate the amount of imbalance of the wheel at a position opposite said force transducer.

6. A balancing machine as in claim 5 including means associated with said drive shaft for generating a second signal indicative of the angular position of the imbalance on the rotating member.

7. A wheel balancing machine as in claim 5 including a second force transducer serving to generate an electrical signal proportional to force, means for mounting said second force transducer between said force arm and said fixed means opposite said wheel, means for urging said force arm and fixed means toward one another to clamp the transducer therebetween at a selected location spaced from the other transducer, and means connected to receive said electrical signals from the second transducer and generate a signal proportional to the force whereby to indicate the amount of imbalance of the wheel at a position opposite said second transducer.

8. A wheel balancing machine as in claim 5 including a driven shaft, in which said drive shaft is flexibly coupled to one end of the driven shaft and the other end of said driven shaft is connected to said flexible drive means.

9. A wheel balancing machine comprising a force transmitting member including a force arm, means for supporting said force transmitting member so that it can move substantially only in one plane, a drive shaft for driving said wheel mounted on said force transmitting member spaced from and having its axis parallel to said force arm, means for mounting the wheel to be balanced on said drive shaft opposite said force arm, fixed means comprising a pair of fixed members disposed in said plane of movement one on each side of said force arm, a force transducer serving to generate an electrical signal proportional to force, means movable along said force arm for mounting said force transducer between said force arm and said fixed means opposite said wheel, means for urging said force arm and fixed means towards one another comprising a cam mounted on said force arm and acting against one of said fixed members to urge the force arm towards the other fixed member to clamp said transducer therebetween, means for driving the shaft and wheel whereby to generate imbalance forces which are transferred by said force transmitting member to said arm, and means connected to receive said electrical signal and generate a first signal proportional to the force whereby to indicate the amount of imbalance of the wheel at a position opposite said force transducer.

10. A wheel balancing machine as in claim 9 in which a floating lock ball is disposed between said cam and said one of said fixed members.

11. A wheel balancing machine comprising a force transmitting member, means for supporting said member so that it can move only in one plane, a drive shaft carried by said force transmitting member with one end adapted to removably receive said wheel to drive the same, means associated with the other end of said drive shaft for driving said shaft, means associated with said shaft for generating a reference signal when the shaft rotates through a reference position, means associated with said shaft for generating position signals indicative of the angular position of said shaft, a force transducer mounted opposite said wheel so that forces transmitted through said force transmitting member generate signals which are proportional to imbalance forces on the wheel in the plane of the wheel opposite said transducer, means responsive to said imbalance signals and said position signals providing an indication of imbalance forces and means responsive to the reference signal, position signals and imbalance signal for providing an indication of the imbalance position.

\* \* \* \* \*